June 27, 1939.  F. S. HAAS  2,163,836

BACKLASH-ELIMINATING MECHANISM FOR MACHINE TOOLS

Filed June 23, 1937

INVENTOR.
FREDERICK S. HAAS
BY
H. H. Parsons
ATTORNEY.

Patented June 27, 1939

2,163,836

UNITED STATES PATENT OFFICE 2,163,836

BACKLASH-ELIMINATING MECHANISM FOR MACHINE TOOLS

Frederick S. Haas, Cincinnati, Ohio, assignor to Cincinnati Grinders Incorporated, Cincinnati, Ohio, a corporation of Ohio Application June 23, 1937, Serial No. 149,848

9 Claims. (Cl. 90—22)

This invention relates to transmission mechanism and more particularly to the elimination of backlash from such mechanisms as are utilized for the propulsion of precision machine tools.

One of the objects of this invention is to provide backlash eliminating mechanism which is simple and compact in construction; easy to adjust; has long life; and is adjustable for wear.

Other objects and advantages of the present invention should be readily apparent by reference to the following specification considered in conjunction with the accompanying drawing illustrative of one embodiment thereof, but it will be understood that any modifications may be made in the specific structural details within the scope of the appended claims without departing from or exceeding the spirit of the invention.

Referring to the drawing in which like reference numerals indicate like or similar parts:

Figures 1, 2, 3, 4:
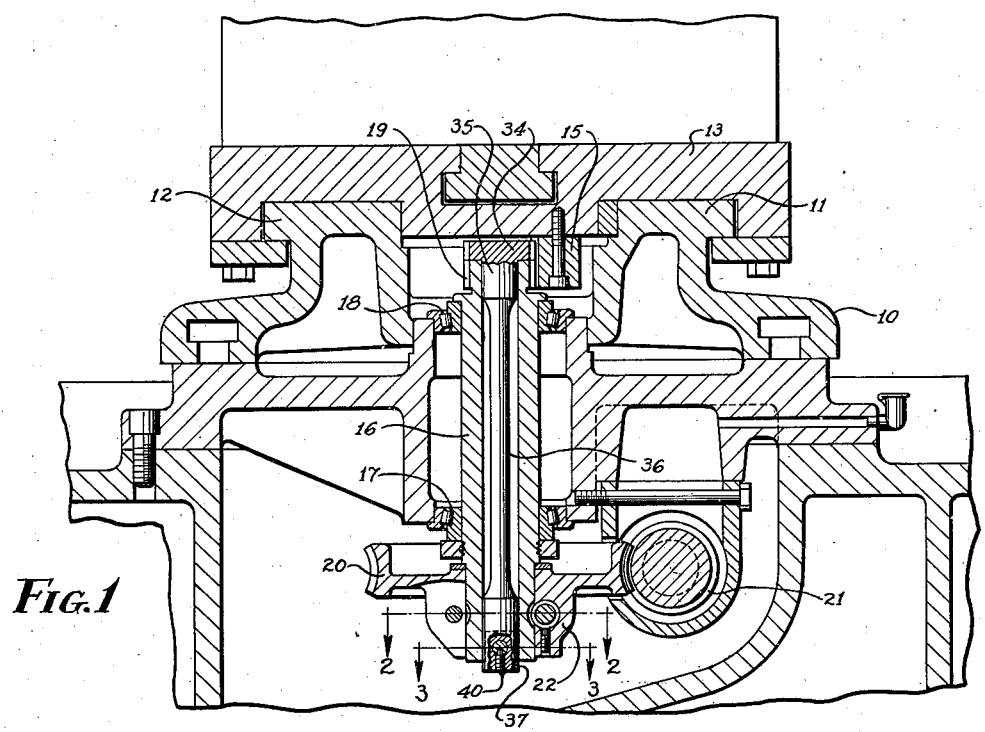
Figure 1 is a sectional view through a machine tool showing an embodiment of the invention.
Figure 2 is a detail section on the line 2—2 of Figure 1.
Figure 3 is a detail section on line 3—3 of Figure 1.
Figure 4 is a plan view showing portions of the different control elements in section in order to illustrate the method of adjustment.

In Figure 1 of the drawing there is shown in section a portion of a conventional machine structure indicated by the reference numeral 10, said structure having guideways 11 and 12 formed thereon for supporting a movable slide 13. This slide may be in the form of a conventional table of a precision grinding machine.

Any suitable form of power transmission mechanism may be utilized for actuating the table, and such transmission is illustrated in the drawing as terminating in the drive shaft 14.

The table 13 has a rack bar 15 attached to the under side thereof and this invention contemplates a simple and compact mechanism for coupling the drive shaft 14 to the rack bar without lost motion. To this end a sleeve 16 is supported by antifriction bearings 17 and 18 in the machine structure 10 and in right angular relation to the direction of movement of the table. The upper end of the sleeve has a pinion 19 secured thereto. The pinion may be a separate member keyed to the end of the sleeve, or it may be integral therewith, as shown in the drawing. The pinion 19 intermeshes with the teeth on the rack bar 15. The lower end of the sleeve carries a toothed member in the form of a worm gear 20 which intermeshes with a worm 21 fixed with the drive shaft 14. The gear 20 has an elongated hub 22 which, as shown in Figure 2, has a worm 23 rotatably mounted therein and intermeshing with the teeth 24 of a worm wheel 25 which is formed integral with the sleeve 16. The worm 23 has an enlarged head 26 which forms a shoulder abutting the side of the hub 22, and a reduced end 27 which passes through a bore 28 formed in the hub, and is threaded to receive a nut 29. To facilitate assembly of the parts and insure a neat fit of the worm wheel 20 on the sleeve, the hub has a kerf 30 cut therein which divides the lower portion of the hub into two parts 31 and 32, the same being adapted to be drawn together by a bolt 33 which is threaded into one of the parts.

A second pinion 34 is provided in co-axial relation to the pinion 19 and in mesh with the teeth of rack bar 15. This pinion is integral with one end of a torsion member 35, which has an elongated reduced portion 36 to facilitate one end being twisted relative to the other end. The lower end 37 of the torsion member is connected by a pin 38, as shown in Figure 3, to the hub 22 of worm gear 20. It will be noted that clearance spaces 39 exist between the side of the pin and the lower portion of the sleeve 16. The pin may be held in position by a set screw 40 threaded into the lower end of the member.

The backlash is eliminated from the driving mechanism by rotating the worm 23 in such a direction that the re-active thrust will cause counterclockwise rotation of the hub 22 and clockwise rotation of the sleeve 16. Such a re-active thrust will cause the teeth 41 of worm wheel 20 to tightly engage the lower side 42 of the thread of worm 21. Since movement in this direction cannot take place, the worm 21 will act as an abutment to cause rotation of the sleeve 16 in a clockwise direction, as viewed in Figure 2. Clockwise rotation of the sleeve 16 will result in clockwise rotation of the pinion 19, as viewed in Figure 4, and thereby movement of the rack 15 in a direction indicated by the arrow 43. The torsion member 35 is connected with the worm gear 20 by means of pin 38, as shown in Figure 3, and therefore during this rotary adjustment of the sleeve relative to the worm gear, the pinion 34 secured to the upper end of the torsion member will remain stationary. This means that the pinion 19 and rack 15 will advance in a general clockwise direction relative to the pinion 34. It will be obvious that during this advancing adjustment that the forward side of the teeth of pinion 19 will be in engagement with the upper side of the rack teeth, as viewed in Figure 4. This movement will continue until the under side of the rack teeth engage one side of the teeth on pinion 34. If the adjustment is carried far enough, it will thereby cause rotation of pinion 34 in a clockwise direction. Since the lower end of the tension member is held against rotation, this will introduce a tension in the member and act to restrain further adjustment of pinion 19. The result, however, will be that the teeth of one pinion will be in tight engagement with one side of the rack teeth and that the teeth of the other pinion will be in tight engagement with the other side of the rack teeth, whereby all lost motion is eliminated from this mechanism.

In order to simplify the explanation, it was assumed that the gear 41 was held against rotation by the worm 42, but it is to be understood that the backlash eliminating mechanism is a self-contained unit and does not necessarily depend upon the assistance of worm 42 when preloading the same. In other words, if the worm gear 42 were removed and the adjusting worm 23 rotated, it will be apparent that a relative movement between the sleeve 16 and the worm 20 will take place, and if the pinion 19 and rack 15 were held against movement by the friction of the slide, it will be apparent that the worm gear 20 would then be the movable member, and would move through space in a counterclockwise direction as viewed in Figure 4. This would cause rotation of the pin 38 integral with the gear and thereby a rotation of the tension member 35 and pinion 34 in a counterclockwise direction until the pinion 34 engaged one side of the rack teeth. Further rotation of the adjusting worm 23 would cause a relative separation between tooth 44 of pinion 19 and tooth 45 of pinion 34, or in other words, opposite directions of rotations of the two pinions, resulting in elimination of any lost motion. The parts would be held in this position by the torsion member 35. The worm gear 20 and the pinions 22 may now be rotated as a unit as by the worm gear 42 to cause movement of the slide.

There has thus been provided an improved backlash eliminating mechanism which is easy to construct and operate, which is inexpensive, and which has long life.

I claim:

1. In a machine tool having a translatable slide, a support therefor, and a rack bar attached to the under side of said slide, the combination of a sleeve antifrictionally supported in said support and having a pinion attached to one end in intermeshing relation with said rack and carrying a driver at the other end, a torsion member passing through said sleeve and carrying a second pinion intermeshing with said rack in coaxial relation to the first pinion, positive means interconnecting the other end of said torsion member to said driver and independently of said sleeve, a worm and worm gear for effecting relative adjustment between the driver and sleeve to thereby place a torque on said torsion member, whereby said pinions will be continuously urged in opposite rotative directions into engagement with opposite sides of the teeth on said rack, whereby backlash will be eliminated between said drive and said rack, and a power operable member for rotating said driver.

2. The combination with a machine tool including a support and a member translatable thereon, of an anti-backlash transmission for effecting relative movement of said parts including a driving member, a pair of co-axial driven members, and means intervening the driving and driven members for effecting an out-of-phase relative urge of said driven members including a positively driven power transmitter coupled with one of said members, a torsion rod having one end connected to the other of said driven members, and means for imparting a variable relative axial twisting movement to the other end of the rod and said transmitter, whereby the relative out-of-phase urge of said driven members may be varied as desired.

3. The combination with a machine tool including a support and a member translatable thereon, of an anti-backlash transmission for effecting relative movement of said parts including a driving member, a pair of co-axial driven members, and means intervening the driving and driven members for effecting an out-of-phase relative urge of said driven members including a positively driven power transmitter coupled with one of said members, a torsion rod having one end connected to the other of said driven members, means for imparting a variable relative axial twisting movement to the other end of the rod and said transmitter, whereby the relative out-of-phase urge of said driven members may be varied as desired, and means for clamping said transmitter and rod in desired relatively adjusted relation.

4. A machine tool transmission of the character described, including a driven member, a gear driven thereby having an offset hub portion, a tubular member rotatably mounted in said hub portion, a driven member carried by said tubular member, and a second driven member adjacent the first, a resilient rod coupled with said second member and telescoping within the tubular member, means directly connecting the rod with the hub at a point remote from the driven member, transmission means engaging said pair of driven members for limiting their potential relative movement, and means for effecting a relative movement between the sleeve and rod at the hub whereby a variable torsion is set up in the rod creating a variable out-of-phase urge as respects the driven members on the rod and sleeve.

5. In a backlash transmission for machine tools including a driven gear having an axially offset hub portion, substantially co-extensive telescoped members each having one terminus extending within said hub, driven members carried by the remote terminii of said telescoping members, a transmission member interlocking with said pair of members and limiting their potential relative movement, means for securing one of said telescoping members in fixed position with respect to the hub, and an adjusting mechanism intervening the hub and the other of said members for effecting variable relative rotation of the members at the hub, whereby a variable torsional strain may be created between said telescoping members to urge their driven members into out-of-phase relationship with a selectively variable force.

6. In a backlash transmission for machine tools including a driven gear having an axially offset hub portion, substantially co-extensive telescoped members each having one terminus extending within said hub, driven members carried by the remote terminii of said telescoping members, a transmission member interlocking with said pair of members and limiting their potential relative movement, means for securing one of said telescoping members in fixed position with respect to the hub, an adjusting mechanism intervening the hub and the other of said members for effecting variable relative rotation of the members at the hub, whereby a variable torsional strain may be created between said telescoping members to urge their driven members into out-of-phase relationship with a selectively variable force, said hub having a slot formed therein permitting of expansion and contraction thereof, and means for contracting the hub to clamp the telescoping members in preselected relatively adjusted position.

7. An anti-backlash transmission for the purpose described including a driving member, a final driven member having a toothed element, a pair of pinions intermeshing with said element, a resilient couple urging said pinions into out-of-phase relationship, means remote from the pinions and final driven member for variably determining the force of resilient out-of-phase urge of said couple, and driving connections between the driving member and said pinions for effecting joint uni-directional actuation thereof.

8. A mechanism of the character described, the combination of a pair of relatively shiftable pinions, of a member having a toothed portion jointly engaged by said pinions for actuation thereby, means tensionable to produce an out-of-phase relative urge of the pinions, a first means for variably determining the tension effecting said out-of-phase urge, a second means for locking the means in preselected tensioned condition, and a common driver coupled with the pinions for effecting joint uni-directional actuation thereof.

9. A backlash eliminating transmission of the character described, including a driven member having a toothed portion, a torsion rod having a pinion thereon meshing with said toothed member, a sleeve circumscribing the rod carrying a second pinion in mesh with said toothed member, said member jointly engaging said pinions and limiting their potential relative rotational movement, a driving member, means for securing one of the pinion bearing elements to the driver, an adjusting mechanism for varying the rotary adjustment of the other pinion bearing element with respect to the driver whereby opposed torsional strains are set up in the rod and sleeve elements when the pinions are in mesh with the transmission member, and means for locking the second pinion bearing element and driver in any position of relative adjustment thereof.

FREDERICK S. HAAS.